Jan. 10, 1961     C. N. KIMBERLIN, JR     2,967,833
PURIFYING WATER INSOLUBLE SOLIDS
Filed Dec. 13, 1952
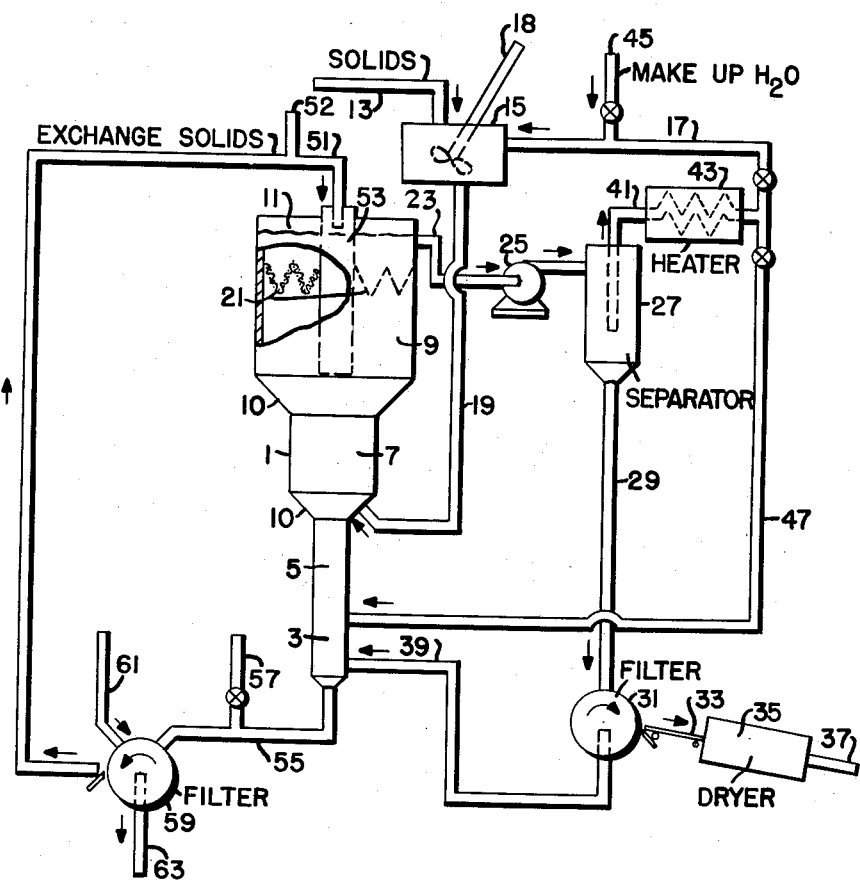
Charles N. Kimberlin Jr. Inventor
By George J. Silkany Attorney

United States Patent Office 2,967,833
Patented Jan. 10, 1961

2,967,833

PURIFYING WATER INSOLUBLE SOLIDS

Charles N. Kimberlin, Jr., Baton Rouge, La., assignor to Esso Research and Engineering Company, a corporation of Delaware Filed Dec. 13, 1952, Ser. No. 325,747

9 Claims. (Cl. 252—317)

This invention relates to a continuous process and an apparatus for removal of ionic impurities from water insoluble powdered solids by treatment with ion exchange resins and more particularly relates to a continuous process for purifying catalytic gels.

In the manufacture of water insoluble powdered solids, it is essential in some cases to remove impurities to obtain a substantially pure solid. These impurities are tenaciously held in the solids and cannot satisfactorily be removed by water washing or else require such a large number of water washings as to be impractical. Even if de-ionized water is used, the amount of such water necessary is prohibitive. For example, in the manufacture of silica-alumina catalysts from sodium silicate, it is difficult to remove residual sodium ions by simple water washing and failure to remove substantially all the sodium ions results in an inferior catalyst for cracking hydrocarbons. Likewise, in the manufacture of zinc-alumina spinel catalysts it is extremely difficult to remove sulfate ions by simple water washing.

According to the present invention cation exchange materials are used to remove cation impurities and anion exchange materials are used for removing anionic impurities.

According to the present invention the solid water insoluble material to be treated, which may be, for example, a spray dried catalyst gel, is continuously treated in an aqueous suspension with an appropriate ion exchange material for removal of undesired ions, hydraulically separated from the exchange material and the exhausted exchange material treated with a regenerating agent and recycled. For the proper operation of the process, the particle size and/or density of the treating exchange material must be different from, preferably greater than, the solid material being treated.

More specifically, according to this invention the water insoluble material to be treated in an aqueous suspension and the ion exchange solid particles are introduced into a mixing zone which is in open communication with a disengaging zone thereabove and a stripping zone and settling zone therebelow. The zones are of different diameters to facilitate separation of the treated solids and ion exchange solids. Water is introduced into the stripping and settling zones and passes upwardly through all the zones carrying the treated solid upwardly while the ion exchange solids pass downwardly through the zones. An aqueous suspension of the treated solids is removed overhead and passed to a primary separating zone to separate most of the water from the suspension and the water is preferably recycled to the process.

As a result of the separation a more concentrated slurry of the treated solid material is obtained and this slurry is passed to a second separating step to recover the treated solids which are preferably dried and recovered. The water from this second separating step is preferably recycled to the process.

The exhausted ion exchange material after passing through the stripping and settling zones is mixed with a regenerating solution and the regenerated exchange material is recycled to the mixing zone for further use. With the present invention it is possible to prepare gels containing less than 0.1% of ionic impurities.

In the drawing the single figure represents one form of apparatus which may be used for carrying out the process of the present invention.

Referring now to the drawing, the reference character 1 designates the main treating vessel which comprises four vertically disposed zones, namely, a settling zone 3, a stripping zone 5, a hindered settling contacting zone 7 and a disengaging zone 9. The stripping zone 5 and settling zone 3 are formed as a relatively small diameter tubular member below the hindered settling zone 7, with the settling zone being below the stripping zone. The hindered settling zone 7 is above the stripping zone 5 and in open communication therewith. The hindered settling zone 7 is also tubular but has a larger diameter than the stripping zone 5. Arranged above the hindered settling zone and in open communication therewith is the disengaging zone 9 which is also tubular but of a larger diameter than the hindered settling zone 7. Vessel 1 has frusto conical portions 10 connecting the different diametered portions or zones 5, 7 and 9 to provide downwardly sloping portions in the vessel to prevent build-up of solids which would occur on horizontal surfaces.

In operation, vessel 1 is filled with an aqueous suspension of the water insoluble material to be treated and purified and of the ion exchange solids up to the overflow level 11. Water flows upward in vessel 1 at different velocities in the different zones. The net flow of the ion exchange solids is downward because they are selected to be of a larger particle size and/or greater density than the solids being treated. The net flow of the solids to be treated is upward, although in a hindered settling zone there is considerable back-mixing of the solids to be treated and the ion exchange solids.

The material to be treated may be a spray-dried or other dried catalytic gel having a particle size range of about 10 to 200 microns with the major portion of the particles being less than about 100 microns in size. The ion exchange solids have a particle size range of about 300 to 2000 microns and are about the same density as the solids being treated. The material to be treated is introduced by line 13 into a mixing vessel 15 and slurried with water introduced into vessel 15 by line 17. The vessel 15 is provided with a stirrer 18 or other means for mixing the contents of vessel 15. The slurry from vessel 15 is passed through line 19 and introduced into the lower portion of the hindered settling zone 7 where it is contacted with ion exchange solids and freed of its ionic impurity. As above pointed out, mixing of the solids to be treated and the ion exchange solids is obtained in zone 7. The exchange reaction in zone 7 may be conducted at any temperature in the range of about 32° F. to 212° F. Higher temperatures result in faster exchange rates and improved purification. A temperature in the range of about 160° F. to 190° F. is preferred but no close temperature control is required.

The upward flow of water in zone 7 is at a superficial velocity of about 0.1 to 2.0 feet per minute. The solids to be treated and some of the ion exchange solids are carried upwardly by the flow of water into disengaging zone 9 where the water flow rate is reduced to about 0.05 to 1.0 foot per minute due to the larger diameter of disengaging zone 9 above referred to. In the disengaging zone 9 the ion exchange solids are separated from the solids being treated or purified and fall back into hindered settling zone 7 while the solids to be purified are carried overhead.

If desired, a screen filter 21 may be provided intermediate the top and bottom of the disengaging zone 9 to facilitate or aid in separating treated solid particles from the ion exchange solids. The screen filter may be a 20 to 80 mesh screen and may be a horizontally arranged flat screen, but preferably is provided with concentric corrugations as shown in the drawing to provide a larger filtering surface.

The separated purified solids and water pass overhead from the overflow level 11 through line 23 and pump 25 into a cyclone separating device 27 to separate treated solids from water. Instead of a cyclone separator, a settler or other forms of separating devices may be used. A thickened slurry of treated and purified solids is withdrawn from the bottom of cyclone separator 27 and passed through line 29 to a filter 31 which is shown as a rotary filter but other forms of filters or separating means may be used. The filter cake is removed from the filter and is passed by line 33 to drier 35 which may be any suitable drier. The dried, purified solids leave drier 35 by line 37 and may be passed to storage.

The filtrate comprising solids-free water is withdrawn from the filter 31 and passes by line 39 to the lower section or portion of settling zone 3. Most of this water goes up, but a small part of it is withdrawn with the resin by line 55. Water, which may contain a small amount of treated solids, leaves cyclone separator 27 overhead by line 41 and is preferably heated in a coil 43 or the like. A part of the heated water from coil 43 is passed through line 17 to vessel 15 for slurrying fresh solids to be treated and purified and also to maintain the desired temperature in treating vessel 1. Make-up water may be added to the system by line 45 leading into line 17. The remainder of the heated water from coil 43 passes by line 47 into the lower section or portion of stripping zone 5.

The regeneration of the ion exchange solids will be given presently. Regenerated ion exchange solids are introduced by line 51 and an open ended well 53 into the upper portion of hindered settling contacting zone 7 where they contact the slurry of solid particles to be purified as above mentioned. The well 53 is a small diameter tube extending above overflow level 11 and through the liquid mixture in disengaging zone 9 and has its bottom open end communicating with the upper portion of zone 7.

The ion exchange solids, which may have a particle size of about 50 mesh or larger, descend through zone 7 into stripping zone 5 where they are stripped of entrained solids being treated by means of the upward flow of water which has a flow rate in stripping zone 5 of about 1 to 5 feet per minute. The stripped ion exchange solids settle out into settling zone 3 in which the upward flow of water is only about 0.1 to 1.5 feet per minute or just enough to keep the ion exchange solids from packing. In the settling zone 3, the water slurry of ion exchange particles is concentrated.

The thickened slurry of ion exchange solids is withdrawn from the bottom of settling zone 3 and passed into line 55 where it is contacted with a regenerating solution introduced by line 57 for regenerating the exchange solids. The regenerated solids are separated from the regeneration solution by means of filter 59 which is shown as a rotary filter but other filters may be used. The filtered exchange solids are washed on the filter by spray water from line 61. In the washing step, sufficient water is used to remove substantially all of the regenerating solution. About 1 to 4 volumes of water per volume of resin are used. The filtrate from line 63 may be discarded. Other techniques of regenerating and washing the ion exchange solids may be used. The regenerated and washed ion exchange solids are returned by line 51 to well 53 as above described. From time to time a small amount of make-up ion exchange solids may be added to the system by line 52 to replace unavoidable losses. Line 51 preferably comprises a belt conveyor or other mechanical conveyor such as a bucket conveyor; however, if preferred, the filter-cake from filter 59 may be slurried with water in a vessel not shown and pumped as a slurry through line 51.

The rate at which ion exchange solids are withdrawn by line 55 for regeneration and return by line 51 depends upon the amount of ionic impurities it is desired to remove from the solids being treated and the exchange capacity of the exchange solid being employed. The rate of regeneration and recycle of the exchange solids should be sufficiently great that the exchange capacity of the exchange solids settling out in zone 3 is not completely exhausted. The exchange solids regeneration rate and recycle rate may also be expressed as a ratio of exchange solids to solids being treated. This ratio should be sufficiently great that the total exchange capacity of the regenerated exchange solid entering well 53 be at least as great as, and preferably greater than, the amount of ionic impurities to be removed from the solids passing into zone 7 by lines 13 and 19. For example, when using an exchange solid having an exchange capacity of about 1.0 chemical equivalent per pound and treating a spray dried gel catalyst having an ionic impurity content of about 0.1 chemical equivalent per pound, the ratio of regenerated exchange solid entering well 53 by line 51 to the gel catalyst entering zone 7 by lines 13 and 19 should be at least about 1 to 10 and preferably about 1 to 5 by weight.

When a cation exchange material is to be used, it is preferably a resin of the acid regenerated cation exchange type. Such cation exchange resins are available as commercial products, one brand being sold as "Amberlite" resins. One type of such resin is Amberlite IR–120 (sulfonated polystyrene cation exchange resins). These exchange resins are obtained by condensing aldehydes such as formaldehyde with phenols or certain phenol-sulfonic acids or the like. Other exchange materials such as sulfuric acid-treated coal or wood or waste petroleum sludge or lignite or the like may be used. These exchange materials are treated with an acid such as sulfuric acid or hydrochloric acid to put them in the hydrogen cycle for use in removing cations such as sodium, for example, in the preparation of cracking catalysts.

For regenerating a cation exchange material, the regenerating solution comprises a solution of acid such as sulfuric acid or hydrochloric acid and/or an ammonium salt such as ammonium sulfate or ammonium chloride. When treating and purifying silica-containing gels containing soda as an impurity in a cation exchange step, the regenerating solution for the cation exchange resin may for example be sulfuric acid having a concentration of about 2% to 10% by weight and the amount of dilute acid used may be in the range of 0.125 to 1 gallon per pound of exchange solid.

When an anion exchange material is to be used, it is preferably a resin which generally comprises a polymeric structure containing basic groups such as the amine-aldehyde condensation products, for example, that obtained from phenylenediamine and formaldehyde. The anion resins are treated with a base to put them in the hydroxide cycle prior to their use in removing anions. Anion exchange resins are also available as commercial products such as Amberlite. As a specific example, Amberlite IR–400 (strong base containing quaternary ammonium groups) is one type of anion exchange resin useful in this invention. Other suitable anion exchange materials may be used.

For regenerating anion exchange resins, a base such as a solution of sodium hydroxide may be used. Other regenerating solutions for anion exchange resins are soda ash, ammonia, or a salt such as sodium acetate, the anion of which is harmless in the gel being treated.

The present invention may be used to purify silica gels, alumina gels, useful as such in the purified form, and mixtures such as silica-alumina gels, silica-magnesia gels, silica-alumina-magnesia gels, etc. which are useful as cracking catalysts or as catalysts for other processes. Other catalytic components may be added, as desired, to the purified gels by conventional techniques, either before or after the drying step.

For example, in one process for producing silica-alumina catalyst the silica hydrosol is formed by reacting sulfuric acid and sodium silicate as is well known in the art. The silica sol is agitated and gelled to form small gel particles which are then impregnated with alumina in a known manner and the resulting silica-alumina slurry is spray dried to form microspherical or microspheroidal particles having a particle size of about 20 to 100 microns. The dried spheres contain soda carried over from the sodium silicate and the dried spheres are then treated according to this invention to produce purified silica-alumina catalyst having less than about 0.05% soda by weight.

A low soda content in the silica-alumina catalyst is important since this results in an improved stability permitting the catalyst to retain its catalytic activity in the hydrocarbon cracking process over a long period of time and with repeated regenerations.

The present invention is also useful in purifying zinc-alumina spinel which is extremely difficult to free of sulfate (carried over from the sulfate salt used in preparing the spinel) by simple water washing. The sulfate ion may be removed by treatment according to the present invention with an anion exchange material, which may be an anion exchange resin as above mentioned, and the exchange material may be combined with hydroxide, acetate, nitrate or other harmless anions. The purified zinc-alumina spinel, which contains less than about 0.3 wt. percent sulfate, may be converted into an excellent aromatizing and hydroforming catalyst by the addition of about 7 to 12 wt. percent of molybdena.

The present invention is useful for treating oxides or gels of aluminum, magnesium, zinc, chromium, zirconium, titanium, iron, beryllium, copper, cobalt, nickel and the like, also clays such as acid treated clay catalysts.

The invention is further illustrated by the following example, which, however, is not to be considered as limiting.

A silica-alumina catalyst comprising about 13% alumina on a dry basis is produced by mixing 2 volumes of sodium silicate ($Na_2O.3.25SiO_2$) solution of sp. gr. 1.21 with 1 volume of sulfuric acid solution of sp. gr. 1.19 and adding 1 volume of aluminum sulfate solution of sp. gr. 1.31. The mixture sets to a hydrogel in about 2 hours. After about 12 hours the hydrogel is broken up into lumps about ½ to 2 inches across and treated with 3 volumes of ammonia solution containing about 3.4% ammonia. The hydrogel is allowed to soak in the ammonia solution for about 3 hours whereupon the pH of the mixture is about 7. The ammoniated gel is washed for about 15 hours by percolation with water using a total of about 20 gallons of water per pound of dry silica-alumina.

The washing reduces the sulfate content to a satisfactorily low level of about 0.2 wt. percent (dry basis); however, the soda content remains about 0.5 wt. percent expressed as sodium oxide on a dry basis. This soda content is undesirably high; however, further washing would reduce it only slightly due to the zeolytic nature of the gel. The washed hydrogel is mixed with water and passed through a colloid mill to form a smooth slurry comprising about 5 wt. percent silica-alumina in water. The slurry is spray dried to form a microspheroidal silica-alumina gel catalyst having a particle diameter in the range of about 20 to 100 microns, and a water content of about 15% and comprising about 0.5 wt. percent soda on a dry basis.

The spray dried gel catalyst is introduced by line 13 into mixing vessel 15 at a rate of about 1000 lbs. (dry basis) per hour. In vessel 15 the catalyst is mixed with water introduced by line 17 at a rate of about 375 gallons per hour. The resulting slurry comprising about 2.65 lb. of gel catalyst per gallon of water is passed by line 19 into the lower section of hindered settling mixing zone 7 where it is mixed and contacted with exchange resin Amberlite IR-120 (sulfonated polystyrene cation exchange resin) having a particle size of 20 to 50 mesh. Zone 7 has a cross sectional area of about 3.8 square feet and the upward flow of water in zone 7 is about 1 foot per minute. The gel and some of the treating resin are carried upward by the flow of water into disengaging zone 9. Zone 9 has a cross sectional area of about 38 sq. ft. (exclusive of well 53, which has a cross sectional area of about 1 sq. ft.), and the upward flow of water in zone 9 is about 0.1 foot per minute. In disengaging zone 9 the resin is separated from the gel and falls back into zone 7.

A slurry comprising about 0.6 lb. of gel per gallon of water is removed overhead by line 23 and pump 25 into cyclonic separator 27. A thickened slurry of gel passes from separator 27 to filter 31. The filter cake from filter 31 comprising the gel catalyst, which has had its soda content reduced to about 0.05 wt. percent on a dry basis, is passed to drier 35 and thence to storage. Filtrate from filter 31 amounting to about 200 gallons of water per hour is passed by line 39 to the lower section of settling zone 3. Water containing a small amount of gel leaves separator 27 by line 41 and is heated in coil 43 to a temperature of about 170° F. About 200 gallons of water per hour passes from coil 43 by line 17 into vessel 15. About 175 gallons per hour of make-up water are added by line 45. The remainder of the heater water from coil 43 amounting to about 1200 gallons per hour pass by line 47 into the lower section of stripping zone 5.

Regenerated ion exchange resin Amberlite IR-120 (sulfonated polystyrene cation exchange resin) having a particle size of 20 to 50 mesh is introduced by line 51 into well 53 and thence into the upper section of zone 7 at a rate of about 150 lb. (wet filter cake) per hour. The resin descends through zone 7 into stripping zone 5 where it is stripped of entrained gel by the upward flow of water which has a flow rate in zone 5 of about 3 feet per minute. The cross sectional area of zone 5 is about 1 square foot. The stripped resin settles out into settling zone 3 in which the upward flow of water is about 0.33 foot per minute. The cross sectional area of zone 3 is about 1 square foot. A slurry of exchange resin containing about 3 pounds of resin per gallon of water is withdrawn from the bottom of zone 3 by line 55 and mixed with a 10% solution of sulfuric acid introduced by line 57 at a rate of about 20 gallons per hour. The slurry of acid regenerated resin is passed to filter 59 where the resin is separated from the regenerating solution and washed by a spray of water from line 61, using about 70 gallons of wash water per hour. The combined filtrate and spent wash water are removed by line 63 and discarded. The washed, moist filter cake of regenerated exchange resin is passed by belt conveyor line 51 to well 53.

What is claimed is:

1. A process for purifying gels which comprises passing a water slurry of water insoluble previously dried gel particles to be purified into a hindered settling mixing zone, introducing ion exchange solid particles of a larger size than said gel particles into said mixing zone, said ion exchange solid particles having about the same density as the solid gel particles, introducing water into said mixing zone and passing it upwardly through said mixing zone at a velocity to carry said gel particles and some ion exchange particles upwardly into a superimposed disengaging zone, reducing the velocity of the water in said disengaging zone to cause dropping back of ion exchange particles while permitting upward flow of said gel particles, withdrawing a slurry of ion exchange particles and some of said gel particles from the bottom of said mixing zone into a lower stripping zone in communication with the bottom of said mixing zone, maintaining an upward flow of water in said stripping zone at a velocity to remove said gel particles from the ion exchange particles, passing a slurry of ion exchange particles into a settling zone to form a more concentrated water slurry of ion exchange particles, removing the last mentioned thickened slurry and separating ion exchange particles therefrom, regenerating the ion exchange particles and returning them to said mixing zone, withdrawing a slurry of said gel particles as purified gel particles from the upper portion of said disengaging zone, separating said purified gel particles from the water, drying said purified gel particles and recycling at least part of the water to said settling zone.

2. A process according to claim 1 wherein said water insoluble previously dried gel particles to be purified contain objectionable cations and the ion exchange particles comprise cation exchange particles.

3. A process according to claim 1 wherein said water insoluble previously dried gel particles to be purified contain objectionable anions and the ion exchange particles comprise anion exchange particles.

4. A process according to claim 1 wherein said previously dried gel particles have particle sizes of not greater than about 200 microns and said solid ion exchange particles have particle sizes of not smaller than about 300 microns.

5. A process for purifying gels which comprises passing a water slurry of water insoluble previously dried gel particles to be purified into a hindered settling mixing zone, introducing ion exchange solid particles of a larger size than said gel particles into said mixing zone, said ion exchange solid particles having about the same density as the solid gel particles, introducing water into said mixing zone and passing it upwardly through said mixing zone at a velocity to carry said gel particles and some ion exchange particles upwardly into a superimposed disengaging zone, reducing the velocity of the water in said disengaging zone to cause dropping back of ion exchange particles while permitting upward flow of said gel particles, withdrawing a slurry of ion exchange particles and some of said gel particles from the bottom of said mixing zone into a lower stripping zone in communication with the bottom of said mixing zone, maintaining an upward flow of water in said stripping zone at a velocity to remove said gel particles from the ion exchange particles, passing a slurry of ion exchange particles into a settling zone to form a more concentrated water slurry of said ion exchange particles, removing the last mentioned concentrated slurry and separating ion exchange particles therefrom, regenerating the ion exchange particles and returning them to said mixing zone, withdrawing a slurry of said gel particles as purified gel particles from the upper portion of said disengaging zone, separating most of the water from the slurry of said purified gel particles, using at least part of the recovered water to form the slurry of said gel particles to be treated and passing another portion of the recovered water to said stripping zone, and filtering and drying said purified gel particles.

6. A process for purifying gels which comprises slurrying water insoluble previously dried gel particles with water, passing such slurry into a hindered settling mixing zone containing ion exchange solid particles of a larger size than said gel particles, said ion exchange solid particles having about the same density as the solid gel particles, introducing said ion exchange particles into said mixing zone, passing water upwardly through said mixing zone at a velocity to carry said gel particles and some ion exchange particles upwardly into a communicating disengaging zone superimposed on said mixing zone, reducing the velocity of the upwardly flowing water in said disengaging zone to cause dropping back of ion exchange particles to said mixing zone but maintaining the velocity sufficiently higher to carry said gel particles upwardly, withdrawing a slurry of ion exchange particles and some of said gel particles from the bottom of said mixing zone into a lower stripping zone in communication with said mixing zone, maintaining an upward flow of water in said stripping zone at a velocity greater than that which exists in said mixing zone to strip out said gel particles while permitting downward flow of ion exchange particles, withdrawing a slurry of said gel particles as purified gel particles from the upper portion of said disengaging zone and withdrawing ion exchange particles from the bottom of said stripping zone.

7. A process for purifying gels which comprises introducing a water slurry of water insoluble previously dried gel particles into a mixing zone, introducing ion exchange solid particles of larger size than said gel particles into said mixing zone, said ion exchange solid particles having about the same density as the solid gel particles, passing water upwardly through said mixing zone into a disengaging zone above said mixing zone, controlling the velocity of the water in said disengaging zone to permit upward passage of said gel particles but causing falling back of the ion exchange particles, withdrawing a slurry of said gel particles as purified gel particles from the upper portion of said disengaging zone, withdrawing a slurry of ion exchange particles from the bottom of said mixing zone, regenerating the withdrawn ion exchange particles and returning them to said mixing zone.

8. A process according to claim 7 wherein the slurry of said purified gel particles is passed through a separation step to remove a large proportion of the water and at least part of the removed water is returned to said mixing zone.

9. A process according to claim 7 wherein the slurry of said purified gel is passed through a separation step to remove water and form a more concentrated slurry, at least part of the removed water is used to slurry with said gel particles to be treated, the more concentrated slurry is filtered to recover purified gel particles and the filtrate is returned to the process.

References Cited in the file of this patent

UNITED STATES PATENTS

| 1,193,953 | Wagner | Aug. 8, 1916 |
| 2,191,467 | Haywood | Feb. 27, 1940 |
| 2,326,323 | Benedict | Aug. 10, 1943 |
| 2,384,298 | Green | Sept. 4, 1945 |
| 2,500,210 | Schexnaileder | Mar. 14, 1950 |
| 2,703,314 | Dirnberger | Mar. 1, 1955 |